(12) United States Patent  
Sutardja et al.

(10) Patent No.: US 8,937,457 B2  
(45) Date of Patent: Jan. 20, 2015

(54) POWER MANAGEMENT CIRCUIT OF RECHARGEABLE BATTERY STACK

(71) Applicant: Marvell World Trade Ltd., St. Michael (BB)

(72) Inventors: Sehat Sutardja, Los Alto Hills, CA (US); Pantas Sutardja, Los Gatos, CA (US)

(73) Assignee: Marvell World Trade Ltd., St. Michael (BM)

( * ) Notice: Subject to any disclaimer, the term of this patent is extended or adjusted under 35 U.S.C. 154(b) by 0 days.

(21) Appl. No.: 14/016,567

(22) Filed: Sep. 3, 2013

(65) Prior Publication Data

US 2014/0002005 A1    Jan. 2, 2014

Related U.S. Application Data

(63) Continuation of application No. 12/973,298, filed on Dec. 20, 2010, now Pat. No. 8,525,478.

(60) Provisional application No. 61/292,740, filed on Jan. 6, 2010.

(51) Int. Cl.  
    *H01M 10/46* (2006.01)

(52) U.S. Cl.  
    USPC ............................................. 320/118

(58) Field of Classification Search  
    USPC .............. 320/103, 107, 116, 118, 119, 166  
    See application file for complete search history.

(56) References Cited

U.S. PATENT DOCUMENTS 5,479,083 A    12/1995  Brainard  
5,631,534 A    5/1997   Lewis  
5,814,970 A    9/1998   Schmidt  
6,140,800 A    10/2000  Peterson  
7,583,057 B2   9/2009   Morita  
8,525,478 B2 *  9/2013  Sutardja et al. ............... 320/118

(Continued)

FOREIGN PATENT DOCUMENTS

CN    1574540 A    2/2005  
CN    101471460 A  7/2009

(Continued)

OTHER PUBLICATIONS

First Chinese Office Action for Chinese Application No. 201080020482.7 dated Sep. 27, 2013.

(Continued)

*Primary Examiner* — Edward Tso

(57) ABSTRACT

A system including a plurality of cells connected in series in a rechargeable battery pack and a plurality of cell balancing modules. Each cell balancing module performs voltage balancing of a respective pair of cells. Each cell balancing module includes a communication module to (i) transmit, via a communication link, information about voltages of the respective pair of cells to an adjacent cell balancing module and (ii) receive, via the communication link, from the adjacent cell balancing module, information about voltages of cells corresponding to the adjacent cell balancing module. Each cell balancing module performs, based on the information received from the adjacent cell balancing module, the voltage balancing in response to a voltage difference between any of the plurality of cells being greater than or equal to a predetermined threshold instead of performing the voltage balancing based on a difference between voltages of the respective pair of cells.

12 Claims, 14 Drawing Sheets

(56) References Cited

U.S. PATENT DOCUMENTS

| | | |
|---|---|---|
| 2004/0257042 A1 | 12/2004 | Liu et al. |
| 2005/0029987 A1 | 2/2005 | Lin et al. |
| 2009/0167243 A1 | 7/2009 | Xiao et al. |
| 2013/0300344 A1 | 11/2013 | Sutardja et al. |

FOREIGN PATENT DOCUMENTS

| | | |
|---|---|---|
| JP | H07-322516 A | 12/1995 |
| JP | 2008-042970 A | 2/2008 |
| JP | 2008-206396 A | 9/2008 |
| JP | 2009038960 A | 2/2009 |
| JP | 2009071936 A | 4/2009 |

OTHER PUBLICATIONS

Second Office Action from Chinese Patent Office for Chinese Patent Application No. 201110006450.8 dated Dec. 20, 2013; 12 pages.

International Search Report for Application No. PCT/US2010/029113 (corresponding hereto) mailed Jul. 9, 2010; 11 pages.

Summary of Notice of Reasons for Rejection for Japanese Patent Application No. 2012 503581, Ryuka IP Law Firm, Jan. 29, 2013.

* cited by examiner

POWER MANAGEMENT CIRCUIT OF RECHARGEABLE BATTERY STACK

CROSS-REFERENCE TO RELATED APPLICATIONS

This is a continuation of U.S. patent application Ser. No. 12/973,298 (now U.S. Pat. No. 8,525,478), filed on Dec. 20, 2010, which claims the benefit of U.S. Provisional Application No. 61/292,740, filed on Jan. 6, 2010. The entire disclosures of the above applications are incorporated herein by reference.

FIELD

The present disclosure relates to rechargeable batteries and more particularly to a power management circuit for a rechargeable battery stack.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Rechargeable batteries are used in many applications. The applications may range from portable electronic devices to industrial equipment. For example, the portable electronic devices may include cell phones, cameras, personal digital assistants (PDAs), laptop computers, and notebook computers. The industrial equipment may include fork-lifts, hybrid-electric vehicles, medical equipment, and uninterruptible power supplies.

Rechargeable batteries typically include cells that utilize different chemical technologies and that generate different output voltages. For example, Nickel-Cadmium (NiCd) and Nickel Metal Hydride (NiMH) cells generate an output voltage of 1.2 volts (1.2V). Lithium ion cells generate output voltages ranging from 3.6V to 3.9V.

Many applications utilize voltages that may be greater than the output voltage generated by a single cell. Accordingly, a battery stack of multiple cells may be used to generate output voltages that are greater than the voltage generated by a single cell. For example, a battery stack comprising two cells may generate an output voltage that can power some portable electronic devices. A battery stack comprising hundreds of cells may generate an output voltage that can power some electric vehicles.

SUMMARY

A system comprises a sensing module and a switching module. The sensing module is configured to sense output voltages of first and second cells connected in series in a rechargeable battery stack. The switching module is configured to alternately connect a capacitance across the first cell and the second cell at a switching frequency when a difference in the output voltages is greater than or equal to a first threshold. The switching module is further configured to stop alternately connecting the capacitance when the difference is less than or equal to a second threshold, wherein the first threshold is greater than the second threshold.

In other features, the system further comprises the first and second cells and the capacitance to transfer charge between the first and second cells when the capacitance is alternately connected across the first and second cells at the switching frequency.

In another feature, an integrated circuit (IC) comprises the system.

In another feature, an integrated circuit (IC) comprises the system and further comprises the capacitance.

In another feature, by alternately connecting the capacitance, charge transfer is effected between the first and second cells to prevent overcharging or over-discharging.

In still other features, a system comprises N cells connected in series in a rechargeable battery stack, where N is an integer greater than 1 and (N−1) cell balancing modules to balance output voltages of the N cells. Each of the (N−1) cell balancing modules balances output voltages of adjacent ones of the N cells. Each of the (N−1) cell balancing modules includes a sensing module and a switching module. The sensing module is configured to sense the output voltages of the adjacent ones of the N cells. The switching module is configured to alternately connect a capacitance across a first of the adjacent ones of the N cells and a second of the adjacent ones of the N cells at a switching frequency when a difference in the output voltages of the adjacent ones of the N cells is greater than or equal to a first threshold. The switching module is further configured to stop alternately connecting the capacitance when the difference is less than or equal to a second threshold, wherein the first threshold is greater than the second threshold.

In another feature, each of the (N−1) cell balancing modules further comprises the capacitance to transfer charge between the adjacent ones of the N cells when the capacitance is alternately connected across the adjacent ones of the N cells at the switching frequency.

In another feature, each of the (N−1) cell balancing modules is implemented by an integrated circuit (IC).

In another feature, each of the (N−1) cell balancing modules is implemented by an integrated circuit (IC).

In another feature, by alternately connecting the capacitance, charge transfer is effected between the first and second of the adjacent ones of the N cells to prevent overcharging or over-discharging.

In still other features, a system comprises N cells connected in series in a rechargeable battery stack, where N is an integer greater than 1, and (N−1) cell balancing modules to balance output voltages of the N cells. Each of the (N−1) cell balancing modules balances output voltages of adjacent ones of the N cells. Each of the (N−1) cell balancing modules includes a communication module and a switching module. The communication module is configured to communicate the output voltages of the adjacent ones of the N cells to others of the (N−1) cell balancing modules via a communication link. The switching module is configured to alternately connect a capacitance across a first of the adjacent ones of the N cells and a second of the adjacent ones of the N cells at a switching frequency when a difference in output voltages of two of the N cells is greater than or equal to a predetermined threshold.

In another feature, each of the (N−1) cell balancing modules further comprises a sensing module to sense the output voltages of the adjacent ones of the N cells.

In another feature, each of the (N−1) cell balancing modules further comprises the capacitance to transfer charge between the adjacent ones of the N cells when the capacitance is alternately connected across the adjacent ones of the N cells at the switching frequency.

In other features, the system further comprises a stack control module configured to communicate with one of the (N−1) cell balancing modules via the communication link. The stack control module receives the output voltages of the N cells via the communication link. The stack control module controls coupling of the rechargeable battery stack to a charging system based on the output voltages of the N cells.

In another feature, the stack control module controls coupling of the rechargeable battery stack to a load based on the output voltages of the N cells.

In another feature, by alternately connecting the capacitance, charge transfer is effected between the first and second of the adjacent ones of the N cells to prevent overcharging or over-discharging.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1A:
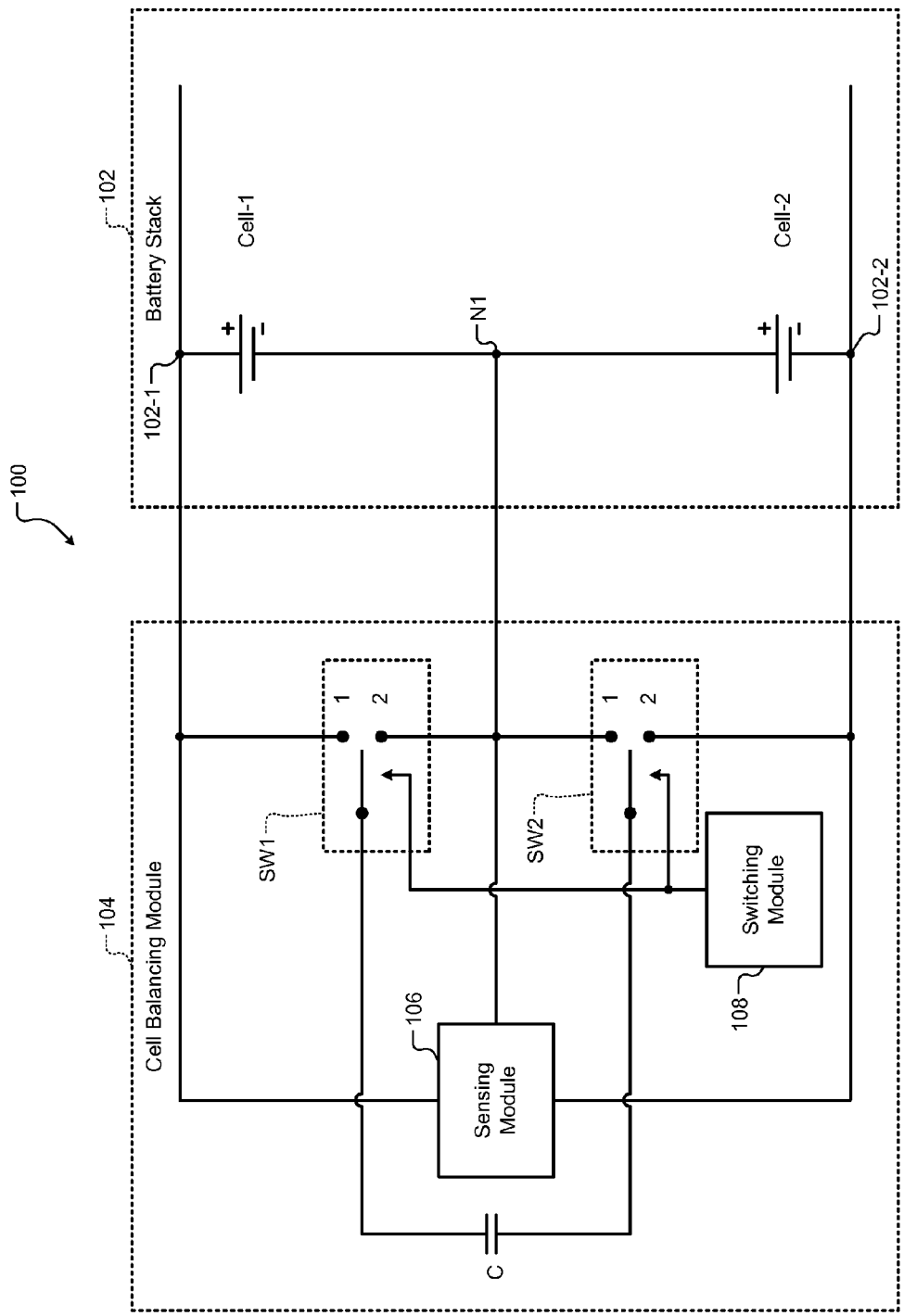
FIG. 1A is a functional block diagram of a system for charging/discharging two adjacent cells of a battery stack.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

A cell of a battery has a capacity to store a predetermined amount of charge. The capacity may be called a rated capacity of the cell. An amount of charge remaining in the cell at any time may be expressed in terms of a state of charge of the cell. A cell is in a fully charged state when charged to its maximum capacity (e.g., the rated capacity). Conversely, a cell is in a fully discharged state when discharged to a minimum capacity. The output voltage of the cell is a function of the state of charge of the cell.

Occasionally, a cell may be unable to store charge according to its rated capacity. Instead, the cell may store less charge than its rated capacity. A cell may be called a weak cell or a strong cell based on its ability to store charge according to its rated capacity.

For example, a strong cell can store charge nearly equal to its rated capacity when fully charged. Conversely, a weak cell stores considerably less charge than its rated capacity when fully charged.

When cells are connected in series in a battery stack, the same amount of current flows through the cells during charging and discharging. During charging, a weak cell charges faster than a strong cell and is fully charged before the strong cell. An output voltage of the weak cell reaches its maximum rated value before the strong cell. The weak cell is overcharged when charging is continued to fully charge the strong cell. The output voltage of the weak cell exceeds its maximum rated value when the weak cell is overcharged.

During discharging, the weak cell discharges faster than the strong cell and is fully discharged before the strong cell. The output voltage of the weak cell decreases from its maximum rated value faster than the strong cell. The strong cell may reverse charge the weak cell when discharging is continued until the strong cell is fully discharged.

Frequent overcharging and reverse charging adversely impacts the number of useful charge-recharge cycles of the cells. Most cells have limited number of useful charge-recharge cycles. For example, lead-acid cells may have 200-500 useful charge-recharge cycles. Nickel-Cadmium (NiCd) cells may have 500-1200 useful charge-recharge cycles. Lithium ion cells may have 300-500 useful charge-recharge cycles. The number of useful charge-recharge cycles is considerably reduced when the cells weaken and are overcharged for a prolonged period of time. Moreover, the cells may be damaged when the weak cells are completely discharged and are reversed charged.

To prevent overcharging and over-discharging of the weak cells, the battery stack may be operated at less than its rated capacity. For example, a charging cycle of the battery stack may be terminated when the weak cell is fully charged. Terminating the charging cycle when the weak cell is fully charged may prevent other cells in the battery stack from fully charging. As a result, the battery stack may supply less power than its rated capacity.

Conversely, a discharge cycle of the battery stack may be terminated when the weak cell is fully discharged. Terminating the discharge cycle when the weak cell is fully discharged may prevent other cells in the battery stack from fully discharging. As a result, the battery stack may supply less power than its rated capacity.

Operating the battery stack at less than its rated capacity may result in waste due to unused capacity of the battery stack. Additionally, operating the battery stack at less than its rated capacity may increase the number of charge-recharge cycles.

Instead, each cell of the battery stack may be monitored individually. The charging and discharging of each cell may be controlled to prevent damage to the weak cells. For example, controllable dissipative bypass devices may be used with each cell. A controller that controls charging and discharging may sense when a weak cell is fully charged. The controller may turn on a dissipative bypass device associated with the weak cell when the weak cell is fully charged. The dissipative bypass device prevents the weak cell from further charging while other cells are allowed to charge to their full capacity. Thus, the dissipative bypass device prevents overcharging of the weak cell.

Additionally, the controller may sense when the weak cell is nearly fully discharged. The controller may disable further discharging of the weak cell when the weak cell is nearly fully discharged. Thus, the controller may prevent over-discharging of the weak cell.

This approach protects the weak cells from being overcharged and over-discharged. However, the useful capacity of the strong cells is not made available to the application. Further, using dissipative bypass devices reduces round-trip charge/discharge efficiency during charging.

The present disclosure relates to using a capacitive charge transfer between adjacent cells of a battery stack to equalize output voltages of the adjacent cells. Specifically, the output voltages of adjacent cells may be equalized using capacitive charge transfer by alternately connecting a capacitor across a first cell and a second cell.

For example, the output voltage of the first cell may be greater than the output voltage of the second cell. The capacitor may charge when connected across the first cell and discharge when connected across the second cell. The capacitor may be connected alternately across the first and second cells until the output voltages of the first and second cells are equal.

Further, the capacitive charge transfer between two adjacent cells (hereinafter charge transfer) may be efficient when the charge transfer is hysteretic. Specifically, the charge transfer may be initiated when a difference in the output voltages becomes greater than an upper threshold. Subsequently, the charge transfer may be terminated when the difference decreases and becomes less than or equal to a lower threshold.

More specifically, the efficiency of the charge transfer is inversely proportional to the difference in the output voltages of adjacent cells. The efficiency is higher when the difference is smaller. Hence, to increase the efficiency, the charge transfer may be initiated when the difference becomes greater than the upper threshold.

Switching the capacitor between adjacent cells, however, dissipates power. When the difference is less than or equal to the lower threshold, the power dissipated in switching the capacitor may outweigh the benefits of reducing the difference further below the lower threshold.

Thus, reducing the difference below the lower threshold may decrease the efficiency of the charge transfer. Accordingly, the switching may be activated when the difference exceeds the upper threshold and deactivated when the difference reaches the lower threshold. In other words, the switching and the charge transfer may be hysteretic.

Referring now to FIG. 1A, a system 100 for balancing (i.e., nearly equalizing) output voltages of cells in a rechargeable battery stack is shown. Since the system 100 balances the output voltages by capacitive charge transfer, the system 100 may be called a capacitive voltage balancing system. The charge transfer and voltage balancing may be performed when the rechargeable battery stack is charging and/or discharging.

The system 100 comprises a rechargeable battery stack 102 (hereinafter battery stack 102) and a cell balancing module 104. For example only, the battery stack 102 comprises a first cell Cell-1 and a second cell Cell-2. Cell-1 and Cell-2 are adjacent cells and are connected in series. The cell balancing module 104 comprises a first switch SW1, a second switch SW2, a capacitor C, a sensing module 106, and a switching module 108.

The cell balancing module 104 controls the charging and discharging of the battery stack 102. The cell balancing module 104 is connected across two outside terminals 102-1, 102-2 of the battery stack 102. In some implementations, the cell balancing module 104 may be integrated into the battery stack 102.

The sensing module 106 is connected across the two outside terminals 102-1, 102-2 of the battery stack 102. Additionally, the sensing module 106 is connected to a node N1 that connects the Cell-1 and Cell-2 in series. The sensing module 106 senses output voltages of Cell-1 and Cell-2 and senses a difference between the output voltages (hereinafter voltage difference).

During charging and discharging of the battery stack 102, the sensing module 106 activates the switching module 108 when the voltage difference is greater than or equal to the upper threshold. The sensing module 106 deactivates the switching module 108 when the voltage difference is less than or equal to the lower threshold. The upper threshold is greater than the lower threshold.

When activated, the switching module 108 switches the capacitor C between Cell-1 and Cell-2 at a predetermined frequency. Specifically, the switching module 108 alternately connects the capacitor C across Cell-1 and Cell-2 at a high switching frequency. For example only, the switching frequency may be in a range from 100 KHz to 1 MHz.

The switching module 108 may comprise a signal generator (not shown) that generates one or more signals having the predetermined switching frequency. The one or more signals may be used to change positions of the switches SW1 and SW2 at the predetermined switching frequency. The capacitor C is connected across Cell-1 when the positions are set to position 1. The capacitor C is connected across Cell-2 when the positions are set to position 2.

An average current through the capacitor C is $C*\Delta V*F$, where C is the capacitor value in Farad, $\Delta V$ is the voltage difference between Cell-1 and Cell-2, and F is the switching frequency. For example only, if $C=1$ µF, $\Delta V=0.1$V, and $F=1$ MHz, the average current during the charge transfer will be approximately 0.1 A.

The first and second switches SW1 and SW2 may be implemented using any semiconductor switching devices. For example only, the first and second switches SW1 and SW2 may be implemented using metal-oxide semiconductor field-effect transistors (MOSFETs). The first and second switches SW1 and SW2 may each have an on-state resistance ($R_{on}$). The capacitor C is selected such that a time constant ($R_{on}*C$) is less than or equal to half the period of the switching frequency.

Figure 1B:
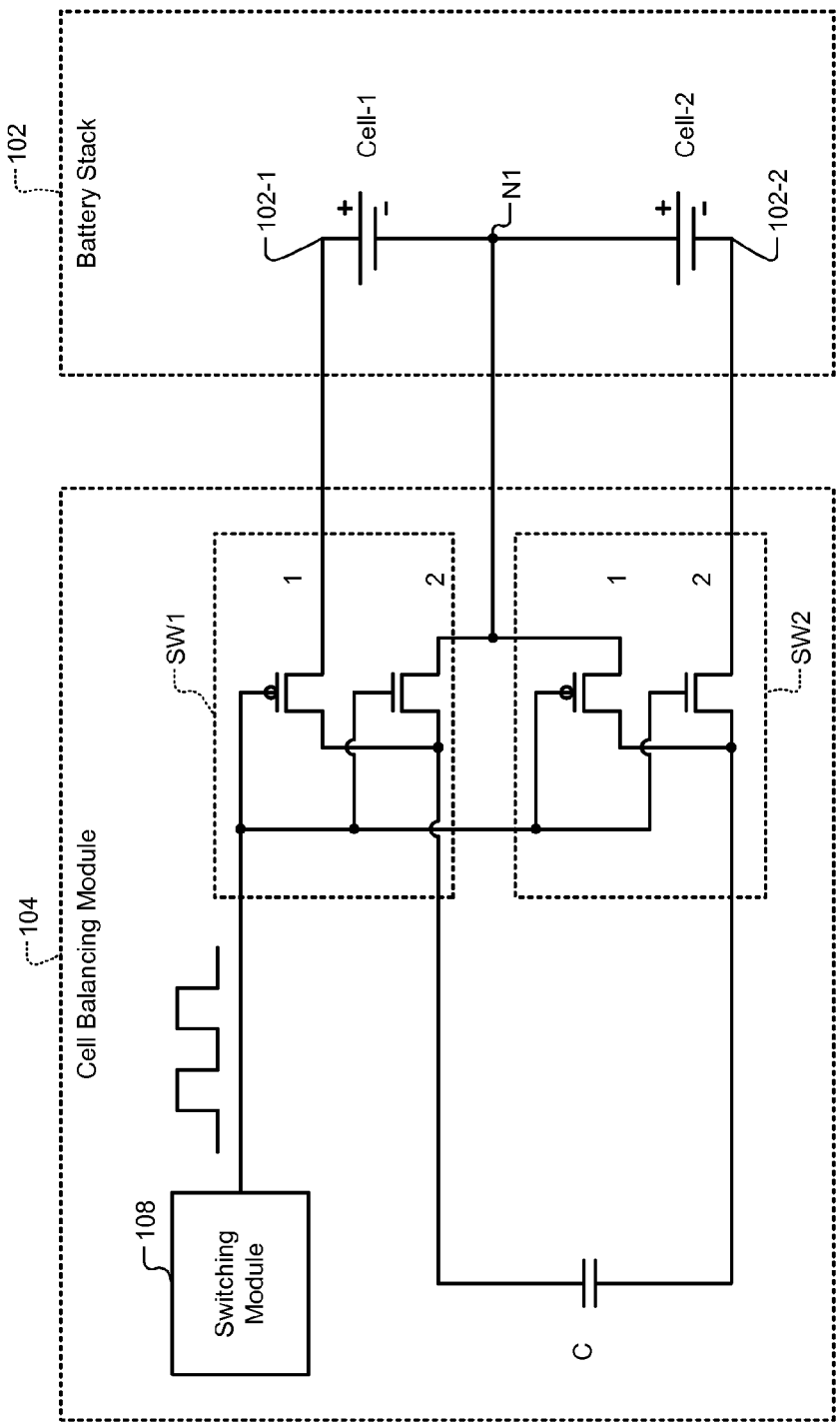
FIG. 1B depicts an exemplary implementation of a cell balancing module.

Referring now to FIG. 1B, an exemplary implementation of the switches SW1 and SW2 is shown. The sensing module 106 is omitted so that the implementation of the switches SW1 and SW2 can be clearly shown. Each of the switches SW1 and SW2 may comprise a negative MOSFET (NMOS) transistor and a positive MOSFET (PMOS) transistor. The gates of the NMOS and PMOS transistors of the switches SW1 and SW2 are driven by a signal generated by the switching module 108. The signal may have the predetermined switching frequency.

Respective first ends (sources) of the NMOS and PMOS transistors of the switch SW1 are connected to a first end of the capacitor C. Respective first ends (sources) of the NMOS and PMOS transistors of the switch SW2 are connected to a second end of the capacitor C. Respective second ends (drains) of the PMOS transistors of the switches SW1 and SW2 provide position 1 of the switches SW1 and SW2. Respective second ends (drains) of the NMOS transistors of the switches SW1 and SW2 provide position 2 of the switches SW1 and SW2.

The second end (drain) of the NMOS transistor of the switch SW1 is connected to the second end (drain) of the PMOS transistor of the switch SW2. The second end of the NMOS transistor of the switch SW1 and the second end of the PMOS transistor of the switch SW2 are connected to the node N1. The drain of the PMOS transistor of the switch SW1 and the drain of the NMOS transistor of the switch SW2 are connected to the two outside terminals 102-1, 102-2 of the battery stack 102, respectively.

When the signal generated by the switching module 108 is low, the NMOS transistors of the switches SW1 and SW2 turn off. The PMOS transistors of the switches SW1 and SW2 turn on and connect the first and second ends of the capacitor C to position 1 of the switches SW1 and SW2. Thus, the capacitor C is connected across Cell-1 when the signal generated by the switching module 108 is low.

When the signal generated by the switching module 108 is high, the PMOS transistors of the switches SW1 and SW2 turn off. The NMOS transistors of the switches SW1 and SW2 turn on and connect the first and second ends of the capacitor C to position 2 of the switches SW1 and SW2. Thus, the capacitor C is connected across Cell-2 when the signal generated by the switching module 108 is high.

The implementation shown in FIG. 1B is for example only. Many other implementations comprising other switching devices are contemplated. The implementations may comprise more or fewer number of transistors (or switching devices) than those shown. Depending on the number of switching devices used, the switching module 108 may generate one or more signals to turn the switching devices on and off. Further, in the implementation shown, the connections of drains and sources may be interchanged. Additionally, the NMOS and PMOS transistors may be interchanged.

In use, for example, Cell-1 may be weaker than Cell-2. During charging of the battery stack 102, the weak cell charges faster than the strong cell. The weak cell may be nearly fully charged while the strong cell is not yet fully charged. The output voltage of the weak cell may be greater than the output voltage of the strong cell. A voltage difference may exist between Cell-1 and Cell-2. The sensing module 106 senses the voltage difference.

When the voltage difference is greater than or equal to the upper threshold, the sensing module 106 activates the switching module 108. The switching module 108 switches the capacitor C alternately between Cell-1 and Cell-2 at the switching frequency. The capacitor C transfers charge from the weak cell to the strong cell. Accordingly, the output voltage of the weak cell decreases while the strong cell continues to charge. Thus, the capacitor C prevents the weak cell from overcharging while the strong cell charges to its full capacity.

As the strong cell charges to nearly full capacity, the voltage difference between Cell-1 and Cell-2 decreases. The sensing module 106 senses when the voltage difference decreases to less than or equal to the lower threshold. The sensing module 106 deactivates the switching module 108 when the voltage difference decreases to less than or equal to the lower threshold. The switching module 108 stops switching the capacitor C alternately between Cell-1 and Cell-2.

During discharging of the battery stack 102, the weak cell discharges faster than the strong cell. The weak cell may be nearly fully discharged while the strong cell is not yet fully discharged. The output voltage of the weak cell may be less than the output voltage of the strong cell. A voltage difference may exist between Cell-1 and Cell-2. The sensing module 106 senses the voltage difference.

When the voltage difference is greater than or equal to the upper threshold, the sensing module 106 activates the switching module 108. The switching module 108 switches the capacitor C alternately between Cell-1 and Cell-2 at the switching frequency. The capacitor C transfers charge from the strong cell to the weak cell. The capacitor C prevents the weak cell from over-discharging while the strong cell fully discharges. Additionally, due to the charge transfer, the output voltage of the weak cell increases to a value greater than the output voltage of the strong cell. This prevents reverse-charging of the weak cell by the strong cell.

The sensing module 106 senses when the voltage difference between Cell-1 and Cell-2 decreases to less than or equal to the lower threshold. The sensing module 106 deactivates the switching module 108 when the voltage difference decreases to less than or equal to the lower threshold. The switching module 108 stops switching the capacitor C alternately between Cell-1 and Cell-2.

Figure 2A:
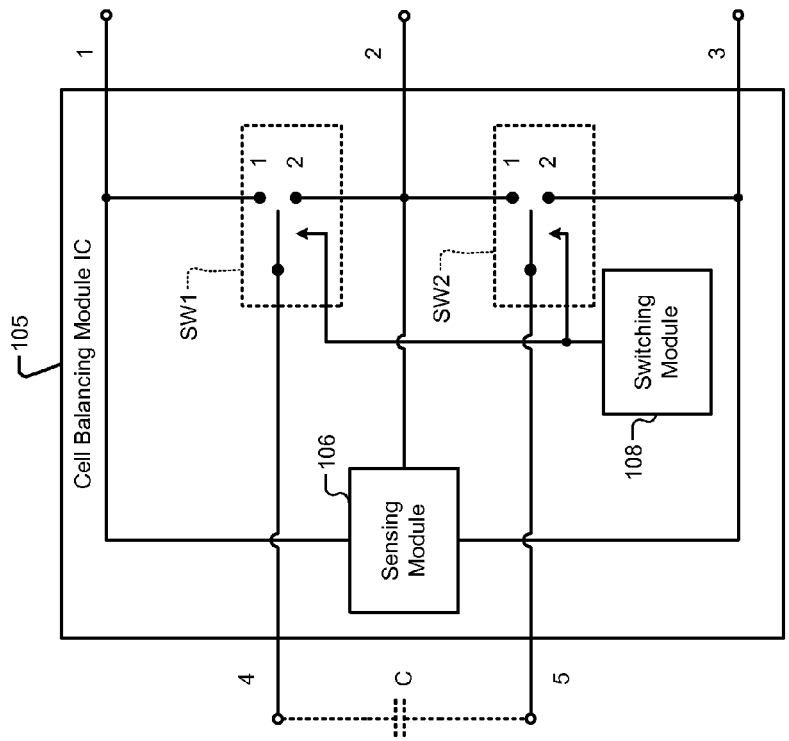
FIG. 2A is a functional block diagram of a cell balancing module integrated circuit (IC) comprising a capacitor.
Figure 2B:
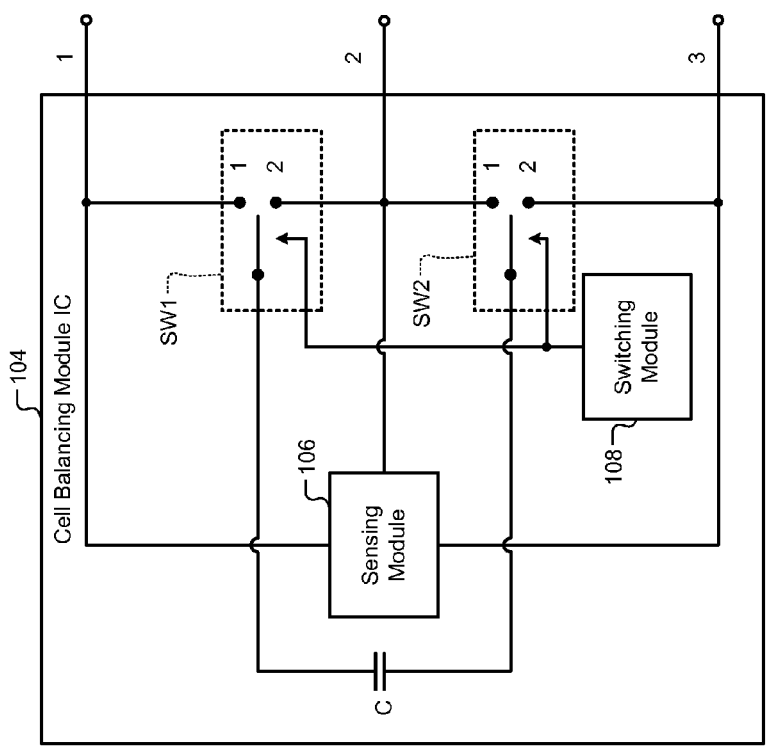
FIG. 2B is a functional block diagram of a cell balancing module IC without a capacitor.

Referring now to FIGS. 2A and 2B, the cell balancing module 104 can be implemented in two ways. In one implementation, the cell balancing module 104 can be implemented by a 3-terminal integrated circuit (IC). In FIG. 2A, a cell balancing module IC 104 comprising the capacitor C and having three terminals is shown.

Alternatively, if the capacitor C is not integrated in the same IC, the cell balancing module 104 without the capacitor C may be implemented by a 5-terminal IC. In FIG. 2B, a cell balancing module IC 105 without the capacitor C and having five terminals is shown. The capacitor C is connected externally to two of the five terminals as shown.

Generally, the battery stack 102 may include N cells, where N is an integer greater than 1. One cell balancing module 104 may be used for every two adjacent cells. Accordingly, (N−1) number of the cell balancing module 104 may be used to balance the N cells of the battery stack 102.

Figure 3A:
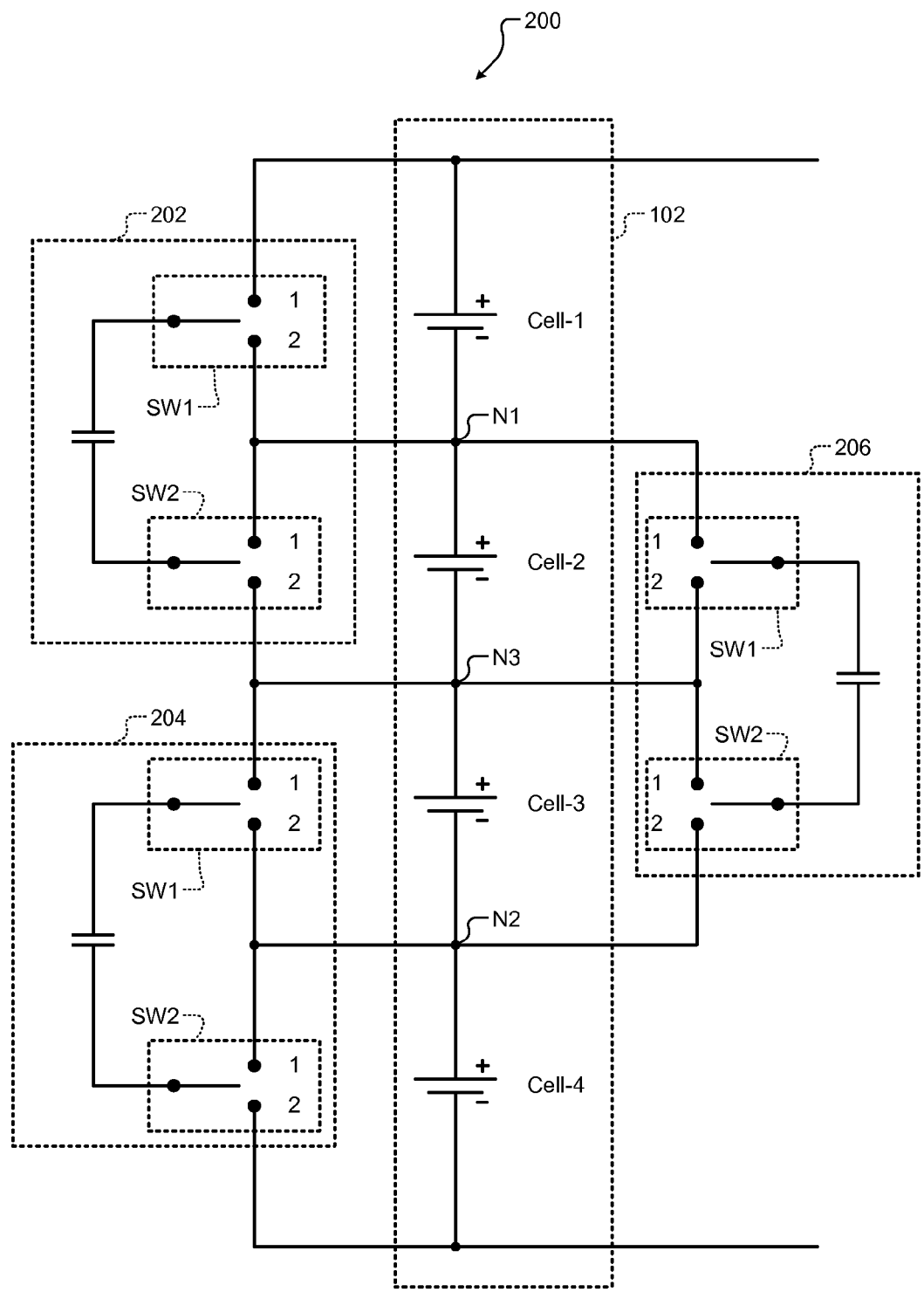
FIGS. 3A-3C are functional block diagrams of systems for charging/discharging four cells of a battery stack.
Figure 3B:
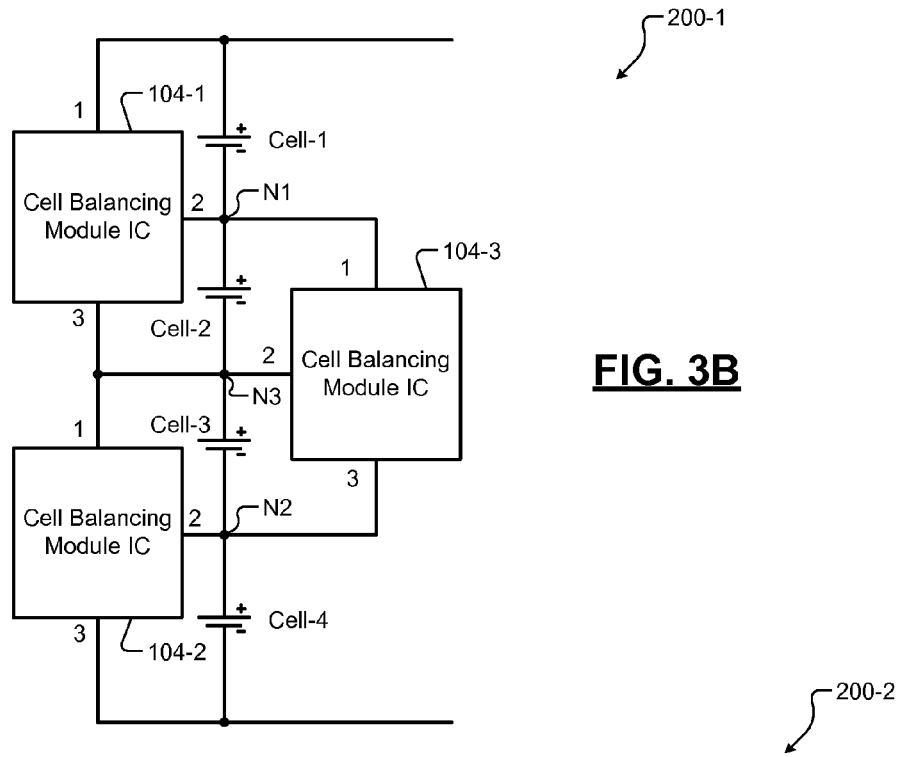
Figure 3C:
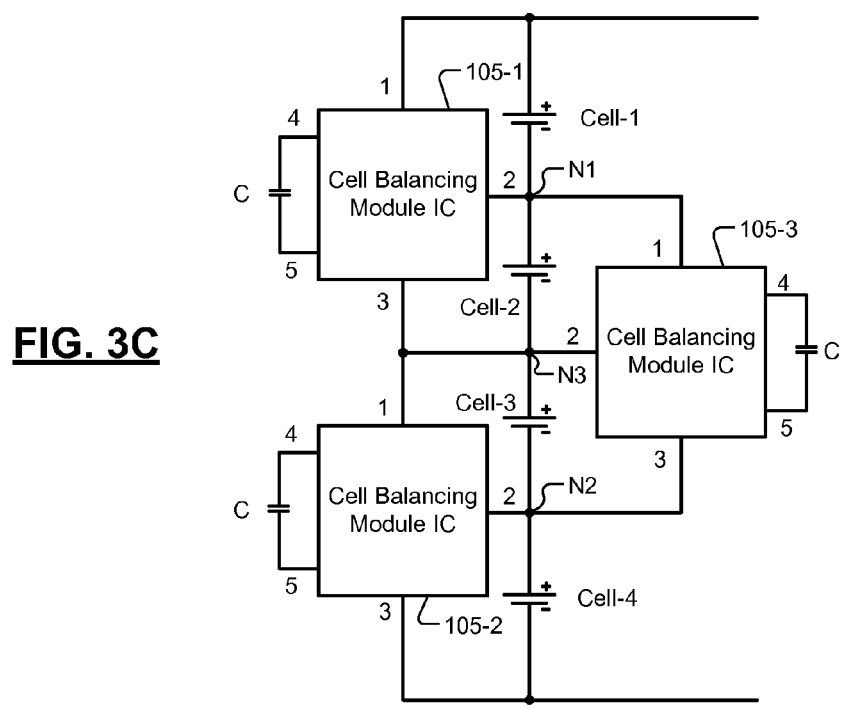

Referring now to FIGS. 3A-3C, for example, various systems for capacitive voltage balancing of four cells of the battery stack 102 are shown. In FIG. 3A, a schematic of a system 200 comprising three cell balancing modules to balance four cells of the battery stack 102 is shown. In FIG. 3B, a functional block diagram of a system 200-1 comprising the four cells and three cell balancing module ICs 104 is shown. In FIG. 3C, a functional block diagram of a system 200-2 comprising the four cells and three cell balancing module ICs 105 is shown.

In FIG. 3A, the system 200 comprises first, second, and third cell balancing modules 202, 204, 206 and Cell-1, Cell-2, Cell-3, and Cell-4 of the battery stack 102. In the first, second, and third cell balancing modules 202, 204, 206, only the capacitor C and the switches SW1 and SW2 are shown. Other components of the first, second, and third cell balancing modules 202, 204, 206 are assumed present and are omitted for clarity. The first, second, and third cell balancing modules 202, 204, 206 balance the output voltages of Cell-1, Cell-2, Cell-3, and Cell-4.

Specifically, the first cell balancing module 202 balances the output voltages of Cell-1 and Cell-2. The second cell balancing module 204 balances the output voltages of Cell-3 and Cell-4. The third cell balancing module 206 balances the output voltages of Cell-2 and Cell-3.

The first cell balancing module 202 is connected across Cell-1 and Cell-2 and communicates with node N1 that connects the Cell-1 and Cell-2 in series. The second cell balancing module 204 is connected across Cell-3 and Cell-4 and communicates with node N2 that connects the Cell-3 and Cell-4 in series. The third cell balancing module 206 is connected across Cell-2 and Cell-3 and communicates with node N3 that connects the Cell-2 and Cell-3 in series. The third cell balancing module 206 is connected across the nodes N1 and N2.

In FIG. 3B, the system 200-1 comprises first, second, and third cell balancing module ICs 104-1, 104-2, 104-3 and Cell-1, Cell-2, Cell-3, and Cell-4 of the battery stack 102. The first, second, and third cell balancing module ICs 104-1, 104-2, 104-3 balance the output voltages of Cell-1, Cell-2, Cell-3, and Cell-4.

Specifically, the first cell balancing module IC 104-1 balances the output voltages of Cell-1 and Cell-2. The second cell balancing module IC 104-2 balances the output voltages of Cell-3 and Cell-4. The third cell balancing module IC 104-3 balances the output voltages of Cell-2 and Cell-3.

The first cell balancing module IC 104-1 is connected across Cell-1 and Cell-2 and communicates with node N1 that connects the Cell-1 and Cell-2 in series. The second cell balancing module IC 104-2 is connected across Cell-3 and Cell-4 and communicates with node N2 that connects the Cell-3 and Cell-4 in series. The third cell balancing module IC 104-3 is connected across Cell-2 and Cell-3 and communicates with node N3 that connects the Cell-2 and Cell-3 in series. The third cell balancing module IC 104-3 is connected across the nodes N1 and N2.

In FIG. 3C, the system 200-2 comprises first, second, and third cell balancing module ICs 105-1, 105-2, 105-3 and Cell-1, Cell-2, Cell-3, and Cell-4 of the battery stack 102. The first, second, and third cell balancing module ICs 105-1, 105-2, 105-3 balance the output voltages of Cell-1, Cell-2, Cell-3, and Cell-4.

Specifically, the first cell balancing module IC 105-1 balances the output voltages of Cell-1 and Cell-2. The second cell balancing module IC 105-2 balances the output voltages of Cell-3 and Cell-4. The third cell balancing module IC 105-3 balances the output voltages of Cell-2 and Cell-3.

The first cell balancing module IC 105-1 is connected across Cell-1 and Cell-2 and communicates with node N1 that connects the Cell-1 and Cell-2 in series. The second cell balancing module IC 105-2 is connected across Cell-3 and Cell-4 and communicates with node N2 that connects the Cell-3 and Cell-4 in series. The third cell balancing module IC 105-3 is connected across Cell-2 and Cell-3 and communicates with node N3 that connects the Cell-2 and Cell-3 in series. The third cell balancing module IC 105-3 is connected across the nodes N1 and N2.

Figure 3D:
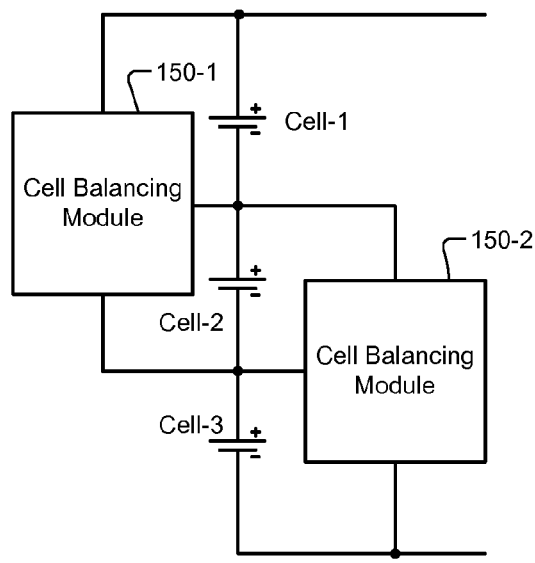
FIGS. 3D and 3E are functional block diagrams of systems for charging/discharging three and five cells of a battery stack, respectively.
Figure 3E:
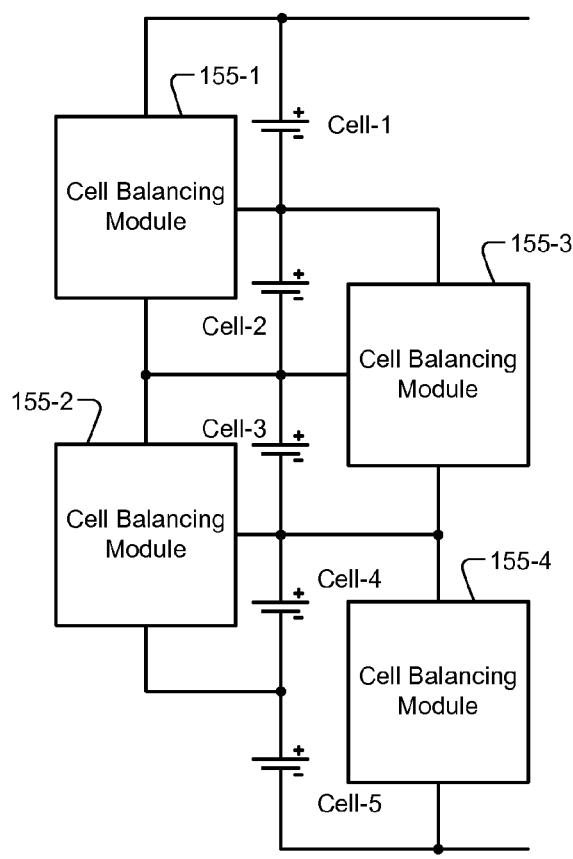

Referring now to FIGS. 3D and 3E, in some implementations, a battery stack may include N cells, where N is an odd integer greater than 1. When the number of cells in the battery stack is odd, one of the cells in a pair balanced by one cell balancing module and one of the cells in a pair balanced by an adjacent cell balancing module may be the same.

In FIG. 3D, for example only, suppose that a battery stack includes three cells: first, second, and third cells (Cell-1, Cell-2, and Cell-3). A first cell balancing module 150-1 may balance output voltages of the first and second cells (Cell-1 and Cell-2) while a second cell balancing module 150-2 may balance output voltages of the second and third cells (Cell-2 and Cell-3). Here, the second cell (Cell-2) is the same in the pairs of cells balanced by both the first and second cell balancing modules 150-1 and 150-2. Each of the cell balancing modules 150-1 and 150-2 may be either the cell balancing module IC 104 or the cell balancing module IC 105.

In FIG. 3E, as another example, suppose that a battery stack includes five cells: first, second, third, fourth, and fifth cells (Cell-1, Cell-2, Cell-3, Cell-4, and Cell-5). A first cell balancing module 155-1 may balance output voltages of the first and second cells (Cell-1 and Cell-2). A second cell balancing module 155-2 may balance output voltages of the third and fourth cells (Cell-3 and Cell-4). A third cell balancing module 155-3 may balance output voltages of the second and third cells (Cell-2 and Cell-3). A fourth cell balancing module 155-4 may balance output voltages of the fourth and fifth cells (Cell-4 and Cell-5).

Here, the second cell (Cell-2) is the same in the pairs of cells balanced by both the first and third cell balancing modules 155-1 and 155-3. The third cell (Cell-3) is the same in the pairs of cells balanced by both the second and third cell balancing modules 155-2 and 155-3. The fourth cell (Cell-4) is the same in the pairs of cells balanced by both the second and fourth cell balancing modules 155-2 and 155-4. Each of the cell balancing modules 155-1, 155-2, 155-3, and 155-4 may be either the cell balancing module IC 104 or the cell balancing module IC 105.

In some implementations, the number of cells (N) in the battery stack 102 may be high. That is, N may be a large number. For example only, N may be of the order of 10, 100, or higher. When N is large, if voltage balancing is performed based on the voltage difference between two adjacent cells, the voltage difference between distant cells can become very high. For example, the voltage difference between the first cell and the last cell in the battery stack 102 may become very high.

When the battery stack 102 comprises a very large number of cells, the cell balancing modules may be linked using communication links. The cell balancing modules may communicate voltage states of the cells in the battery stack 102 via the communication links. The voltage states may include output voltages and/or differences in the output voltages of the cells balanced by the cell balancing modules. Based on the voltage states, the cell balancing modules may perform capacitive voltage balancing when the voltage difference between any two cells is greater than a threshold.

To facilitate the communication links, the cell balancing modules may each comprise a communication module. Additionally, to selectively perform capacitive voltage balancing, the cell balancing modules may each comprise a control module. Accordingly, the cell balancing module ICs 104 and 105 may be modified as follows.

Figure 4B:
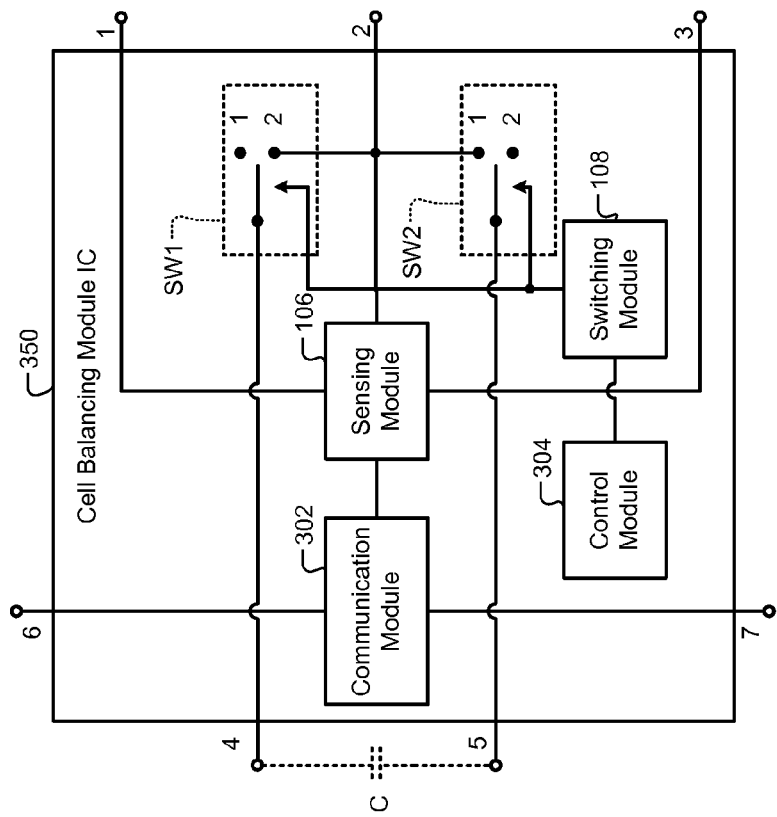
FIG. 4B is a functional block diagram of a cell balancing module IC without a capacitor and comprising a communication module.
Figure 4A:
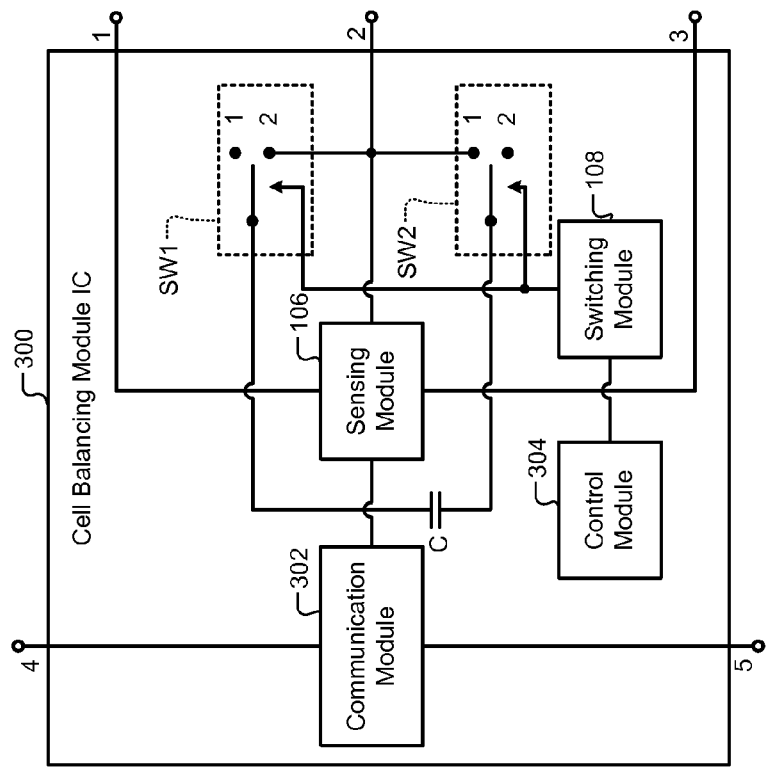
FIG. 4A is a functional block diagram of a cell balancing module IC comprising a communication module and a capacitor.

Referring now to FIGS. 4A and 4B, cell balancing module ICs comprising a communication module and a control module are shown. In FIG. 4A, a cell balancing module IC 300 comprises all the components of the cell balancing module IC 104. Additionally, the cell balancing module IC 300 comprises a communication module 302 and a control module 304.

The communication module 302 communicates with the sensing module 106. The sensing module 106 senses output voltages of adjacent cells (e.g., Cell-1 and Cell-2) and determines voltage states of the adjacent cells. The communication module 302 receives the voltage states of the adjacent cells from the sensing module 106. The communication module 302 communicates with communication modules of adjacent cell balancing module ICs via pins 4 and 5.

The communication module 302 transmits information relating to the voltage states of the adjacent cells balanced by the cell balancing module IC 300 to the adjacent cell balancing module ICs. Additionally, the communication module 302 receives information relating to the voltage states of cells balanced by the adjacent cell balancing module ICs. The communication module 302 receives the information relating to the voltage states from communication modules of the adjacent cell balancing module ICs.

Based on the voltage states of the cells in the battery stack 102, the control module 304 determines whether to activate the switching module 108. Specifically, the control module 304 activates the switching module 108 when the voltage difference between any two cells in the battery stack 102 is greater than a threshold.

In FIG. 4B, a cell balancing module IC 350 comprises all the components of the cell balancing module IC 105. Additionally, the cell balancing module IC 350 comprises the communication module 302 and the control module 304. The communication module 302 communicates with the communication modules of the adjacent cell balancing module ICs via pins 6 and 7. The capacitor C is located externally to the cell balancing module IC 350.

Figure 5A:
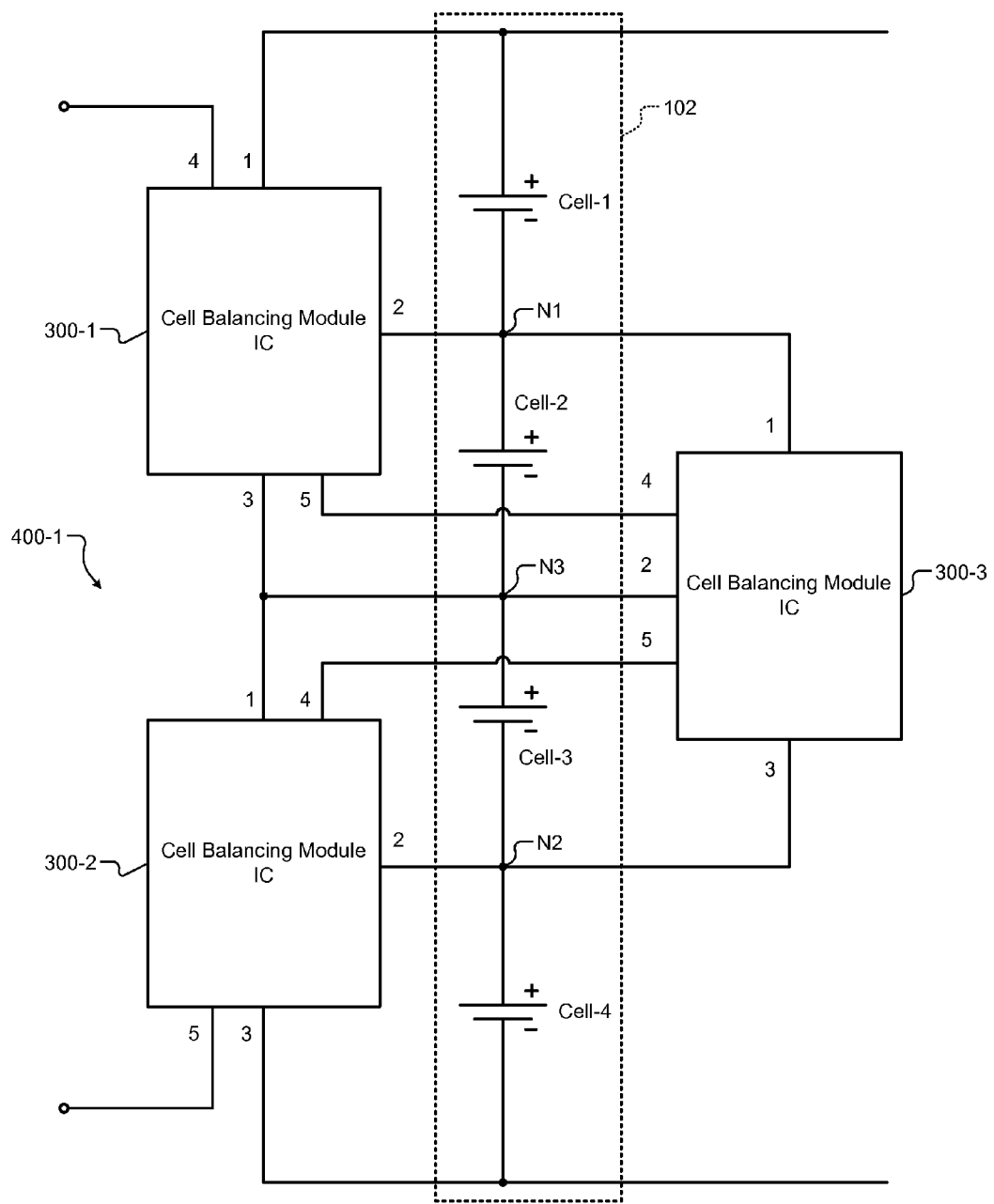
FIGS. 5A-5B are functional block diagrams of systems for charging/discharging a plurality of cells of a battery stack.
Figure 5B:
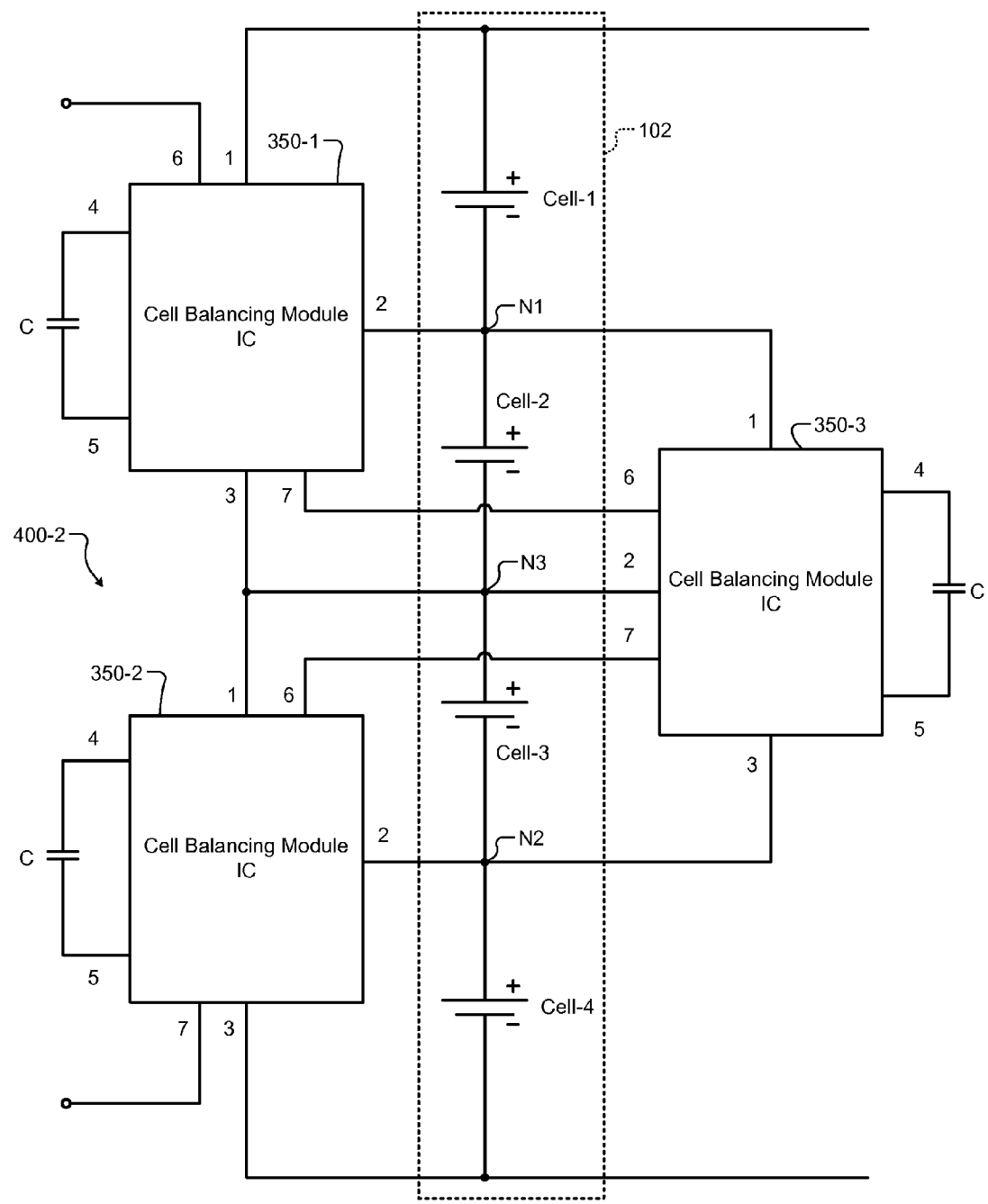

Referring now to FIGS. 5A and 5B, for example, systems for capacitive voltage balancing of four cells of the battery stack 102 are shown. In FIG. 5A, a functional block diagram of a system 400-1 comprising a plurality of the cell balancing module IC 300 is shown. In FIG. 5B, a functional block diagram of a system 200-2 comprising a plurality of the cell balancing module IC 350 is shown.

In FIG. 5A, the system 400-1 comprises first, second, and third cell balancing module ICs 300-1, 300-2, 300-3 and Cell-1, Cell-2, Cell-3, and Cell-4 of the battery stack 102. The first, second, and third cell balancing module ICs 300-1, 300-2, 300-3 balance the output voltages of Cell-1, Cell-2, Cell-3, and Cell-4.

Specifically, the first cell balancing module IC 300-1 balances the output voltages of Cell-1 and Cell-2. The second cell balancing module IC 300-2 balances the output voltages of Cell-3 and Cell-4. The third cell balancing module IC 300-3 balances the output voltages of Cell-2 and Cell-3.

The first cell balancing module IC 300-1 is connected across Cell-1 and Cell-2 and communicates with node N1 that connects the Cell-1 and Cell-2 in series. The second cell balancing module IC 300-2 is connected across Cell-3 and Cell-4 and communicates with node N2 that connects the Cell-3 and Cell-4 in series. The third cell balancing module IC 300-3 is connected across Cell-2 and Cell-3 and communicates with node N3 that connects the Cell-2 and Cell-3 in series. The third cell balancing module IC 300-3 is connected across the nodes N1 and N2.

The first, second, and third cell balancing module ICs 300-1, 300-2, 300-3 are linked via pins 4 and 5 as shown. Specifically, the first, second, and third cell balancing module ICs 300-1, 300-2, 300-3 are linked in the form of a string or a chain as shown. The first, second, and third cell balancing module ICs 300-1, 300-2, 300-3 communicate information relating to the voltage states of Cell-1, Cell-2, Cell-3, and Cell-4.

For example, the first cell balancing module IC 300-1 transmits the voltage states of Cell-1 and Cell-2 to the third cell balancing module IC 300-3. The second cell balancing module IC 300-2 transmits the voltage states of Cell-3 and Cell-4 to the third cell balancing module IC 300-3. The third cell balancing module IC 300-3 transmits the voltage states of Cell-2 and Cell-3 to the first and second cell balancing module ICs 300-1, 300-2.

Thus, each of the first, second, and third cell balancing module ICs 300-1, 300-2, 300-3 receives the voltage states of Cell-1, Cell-2, Cell-3, and Cell-4. Based on the voltage states, the control modules of the first, second, and third cell balancing module ICs 300-1, 300-2, 300-3 activate the respective switching modules. Specifically, the control modules activate the switching modules when the voltage difference between any two of Cell-1, Cell-2, Cell-3, and Cell-4 is greater than the threshold. The threshold may be programmable.

In FIG. 5B, the system 400-2 comprises first, second, and third cell balancing module ICs 350-1, 350-2, 350-3 and Cell-1, Cell-2, Cell-3, and Cell-4 of the battery stack 102. The first, second, and third cell balancing module ICs 350-1, 350-2, 350-3 balance the output voltages of Cell-1, Cell-2, Cell-3, and Cell-4. The capacitor C is located externally to the first, second, and third cell balancing module ICs 350-1, 350-2, 350-3.

Specifically, the first cell balancing module IC 350-1 balances the output voltages of Cell-1 and Cell-2. The second cell balancing module IC 350-2 balances the output voltages of Cell-3 and Cell-4. The third cell balancing module IC 350-3 balances the output voltages of Cell-2 and Cell-3.

The first cell balancing module IC 350-1 is connected across Cell-1 and Cell-2 and communicates with node N1 that connects the Cell-1 and Cell-2 in series. The second cell balancing module IC 350-2 is connected across Cell-3 and Cell-4 and communicates with node N2 that connects the Cell-3 and Cell-4 in series. The third cell balancing module IC 350-3 is connected across Cell-2 and Cell-3 and communicates with node N3 that connects the Cell-2 and Cell-3 in series. The third cell balancing module IC 350-3 is connected across the nodes N1 and N2.

The first, second, and third cell balancing module ICs 350-1, 350-2, 350-3 are linked via pins 6 and 7 as shown. Specifically, the first, second, and third cell balancing module ICs 350-1, 350-2, 350-3 are linked in the form of a string or a chain as shown. The first, second, and third cell balancing module ICs 350-1, 350-2, 350-3 communicate voltage states of Cell-1, Cell-2, Cell-3, and Cell-4.

For example, the first cell balancing module IC 350-1 transmits the voltage states of Cell-1 and Cell-2 to the third cell balancing module IC 350-3. The second cell balancing module IC 350-2 transmits the voltage states of Cell-3 and Cell-4 to the third cell balancing module IC 350-3. The third cell balancing module IC 350-3 transmits the voltage states of Cell-2 and Cell-3 to the first and second cell balancing module ICs 350-1, 350-2.

Thus, each of the first, second, and third cell balancing module ICs 350-1, 350-2, 350-3 receives the voltage states of Cell-1, Cell-2, Cell-3, and Cell-4. Based on the voltage states, the control modules of the first, second, and third cell balancing module ICs 350-1, 350-2, 350-3 activate the respective switching modules. Specifically, the control modules activate the switching modules when the voltage difference between any two of Cell-1, Cell-2, Cell-3, and Cell-4 is greater than the threshold. The threshold may be programmable.

When cell balancing modules are linked as described above, the cell balancing modules can handle a stack of cells having a voltage greater than a voltage that each cell balancing module can sustain. This is because each cell balancing module communicates with one or more adjacent cell balancing modules. Each cell balancing module and the adjacent cell balancing modules operate at the same voltage. The voltage is the same due to overlapped cell operation in the battery stack. Further, the linked cell balancing modules operate without further isolation (e.g., without capacitive coupling).

Figure 6A:
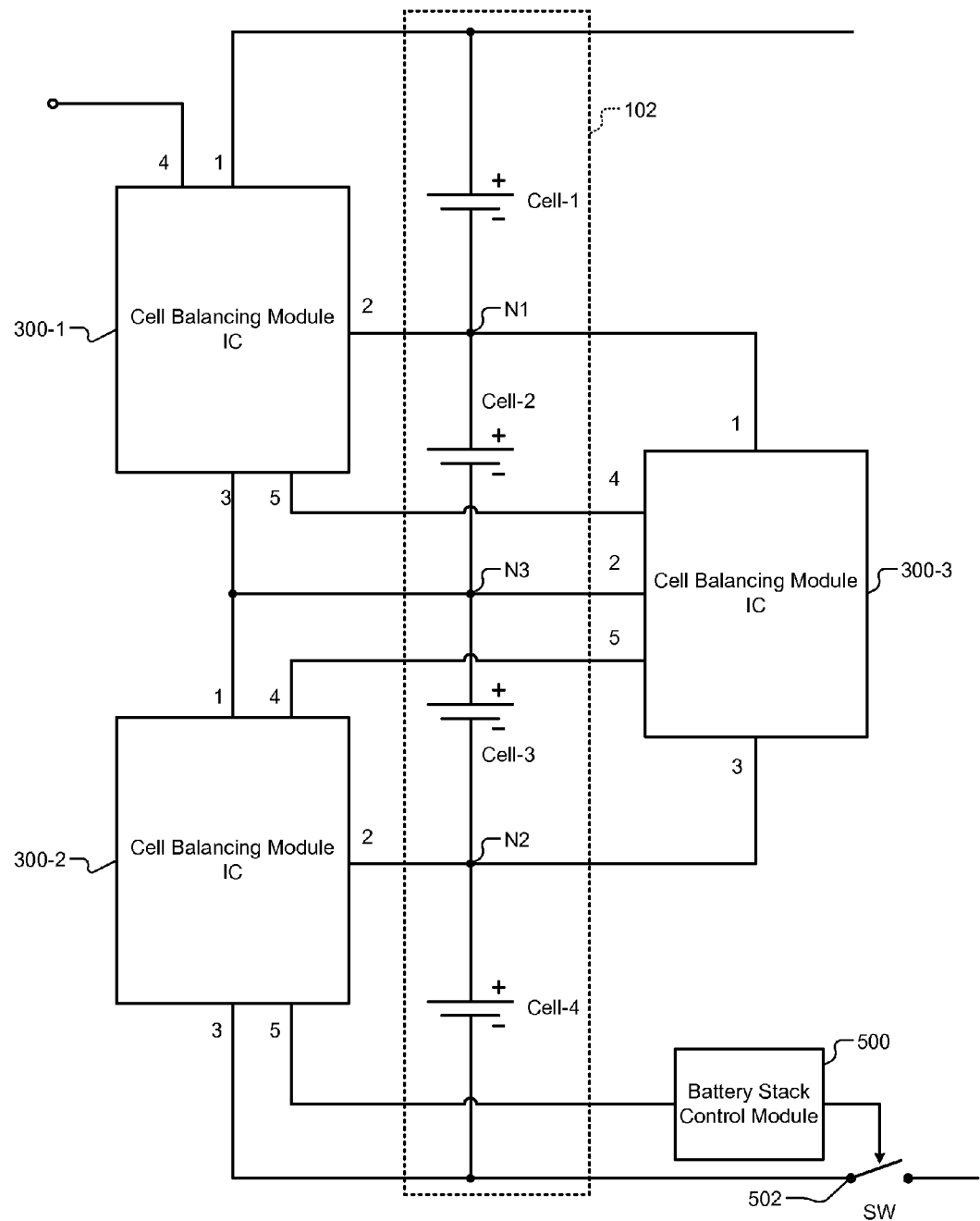
FIGS. 6A-6B are functional block diagrams of systems for connecting/disconnecting a battery stack.
Figure 6B:
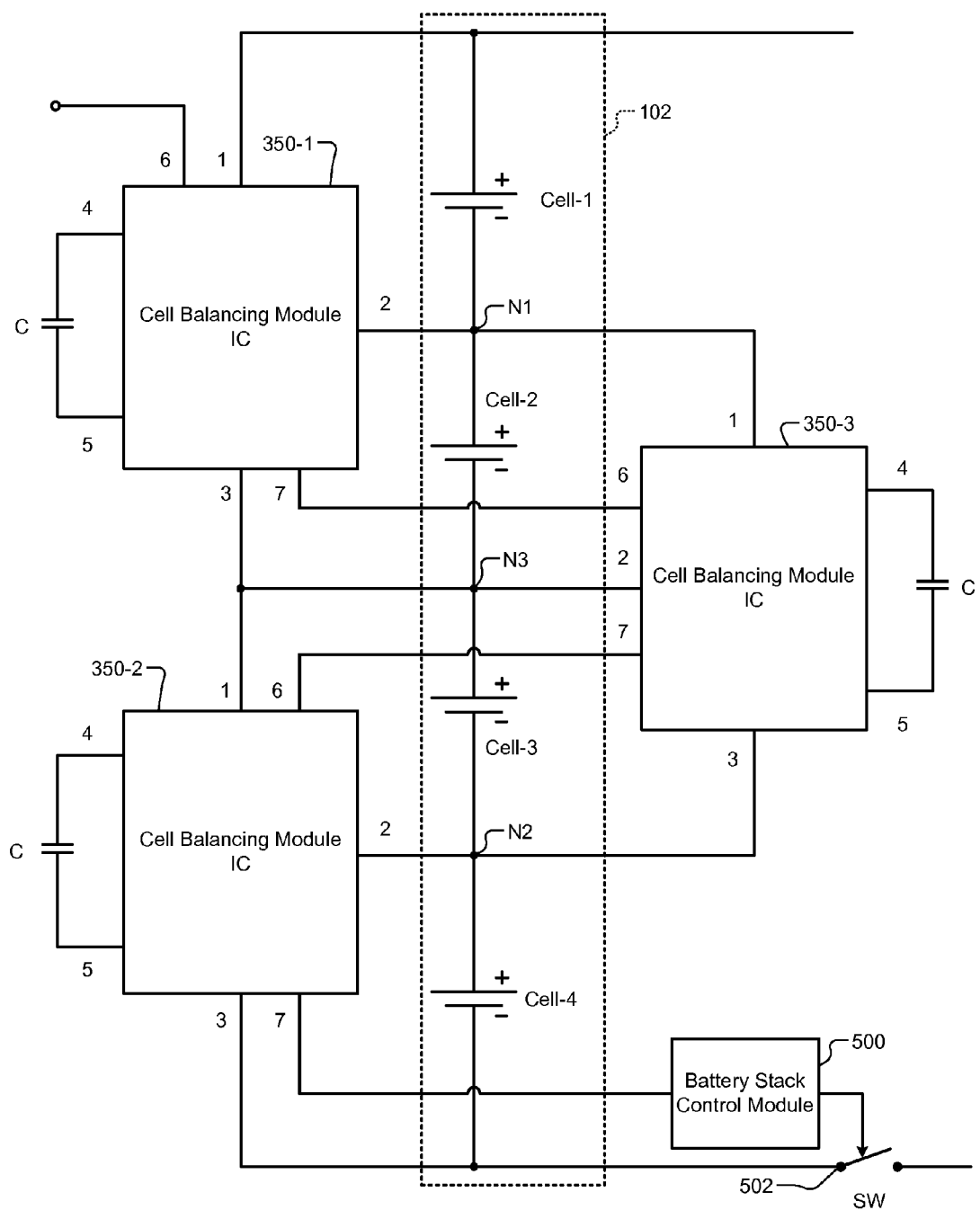

Referring now to FIGS. 6A and 6B, a battery stack control module 500 may communicate with the cell balancing module ICs via a communication link that links the cell balancing module ICs. In FIG. 6A, for example, the battery stack control module 500 communicates with pin 5 of the second cell balancing module IC 300-2. In FIG. 6B, for example, the battery stack control module 500 communicates with pin 7 of the second cell balancing module IC 350-2. In other words, the battery stack control module 500 may be connected to one end of the communication link that links the cell balancing module ICs.

In FIGS. 6A and 6B, the battery stack control module 500 controls a switch 502. The switch 502 connects/disconnects the battery stack 102 to/from a charging system and/or a load (not shown). The battery stack control module 500 receives information relating to the voltage states of the cells of the battery stack 102 from the cell balancing module ICs. The battery stack control module 500 closes/opens the switch 502 based on the voltage states to connect/disconnect the battery stack 102.

Figure 7:
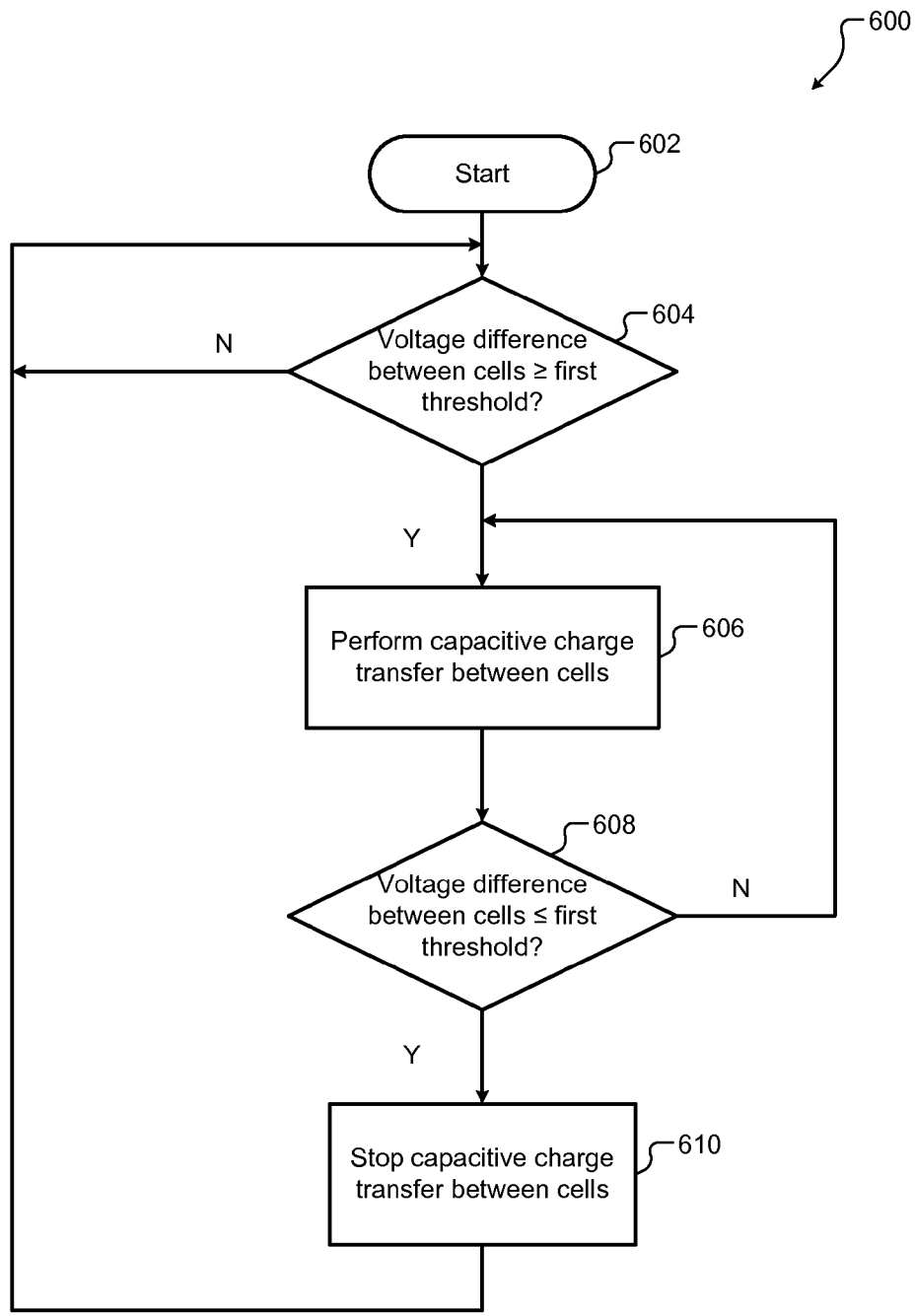
FIG. 7 is a flowchart of a method for charging/discharging cells of a battery stack using hysteresis.

Referring now to FIG. 7, a method 600 for voltage balancing using hysteretic capacitive charge transfer between cells is shown. The method 600 may be performed during charging and/or discharging of a rechargeable battery stack. Control begins at 602. At 604, control determines whether the voltage difference between adjacent cells is greater than or equal to a first threshold. Control repeats 604 until the voltage difference between adjacent cells is greater than or equal to the first threshold.

At 606, control performs capacitive charge transfer between the adjacent cells when the voltage difference between adjacent cells is greater than or equal to the first threshold. At 608, control determines whether the voltage difference between adjacent cells is less than or equal to a second threshold, where the second threshold is less than the first threshold. Control returns to 606 when the voltage difference between adjacent cells is not less than or equal to the second threshold. At 610, control stops the capacitive charge transfer when the voltage difference between adjacent cells is less than or equal to the second threshold. Control returns to 604.

Figure 8:
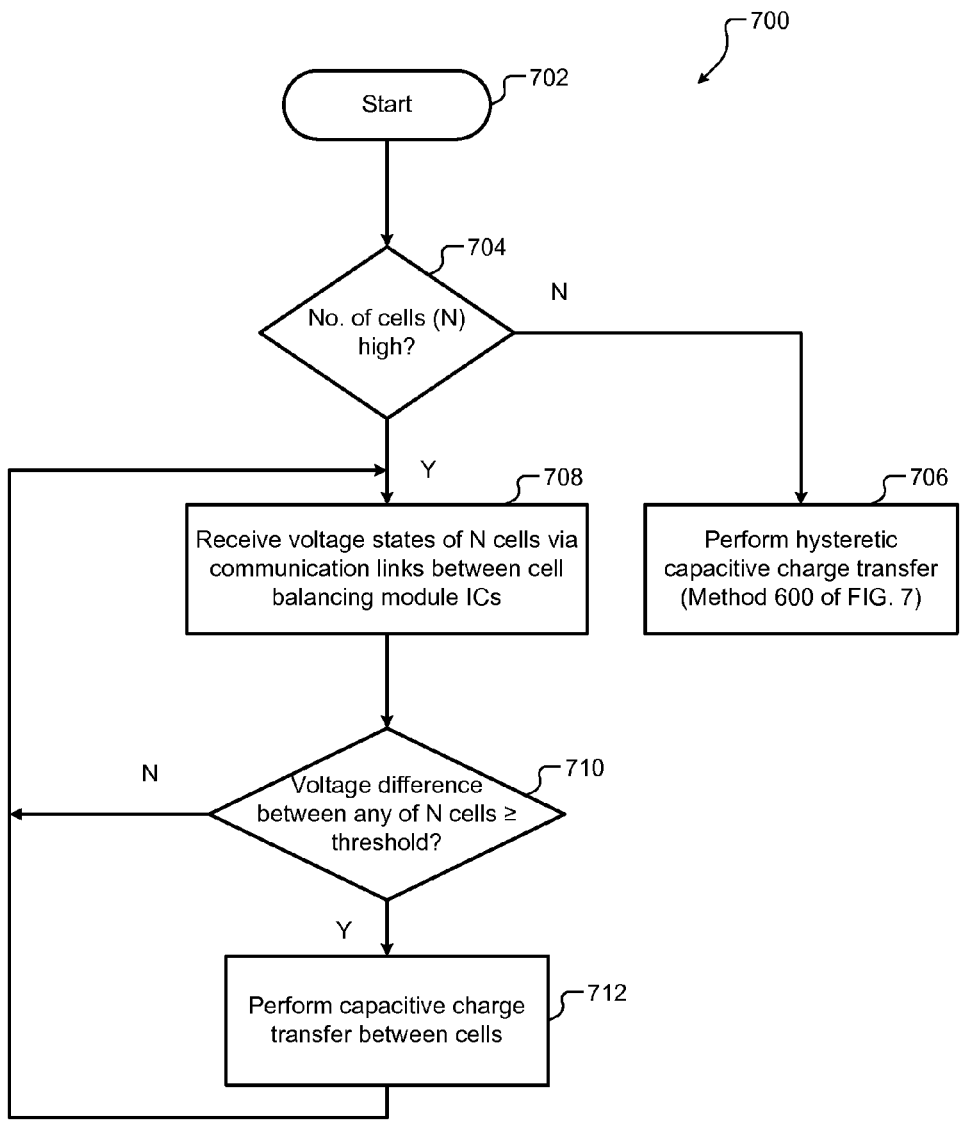
FIG. 8 is a flowchart of a method for charging/discharging cells of a battery stack.

Referring now to FIG. 8, a method 700 for capacitive charge transfer when the number of cells is high is shown. Control begins at 702. At 704, control determines whether the number N of cells in the battery stack is greater than a predetermined number. At 706, control performs hysteretic capacitive charge transfer (method 600 of FIG. 7) when the number N of cells in the battery stack is less than the predetermined number.

At 708, when the number N of cells in the battery stack is greater than or equal to the predetermined number, control receives voltage states of the N cells via communication links between cell balancing module ICs. At 710, control determines based on the voltage states whether the voltage difference between any of the N cells is greater than or equal to a predetermined threshold.

Control returns to 708 when the voltage difference between any of the N cells is less than the predetermined threshold. At 712, when the voltage difference between any of the N cells is greater than or equal to the predetermined threshold, control performs capacitive charge transfer between the N cells. Control returns to 708.

Figure 9:
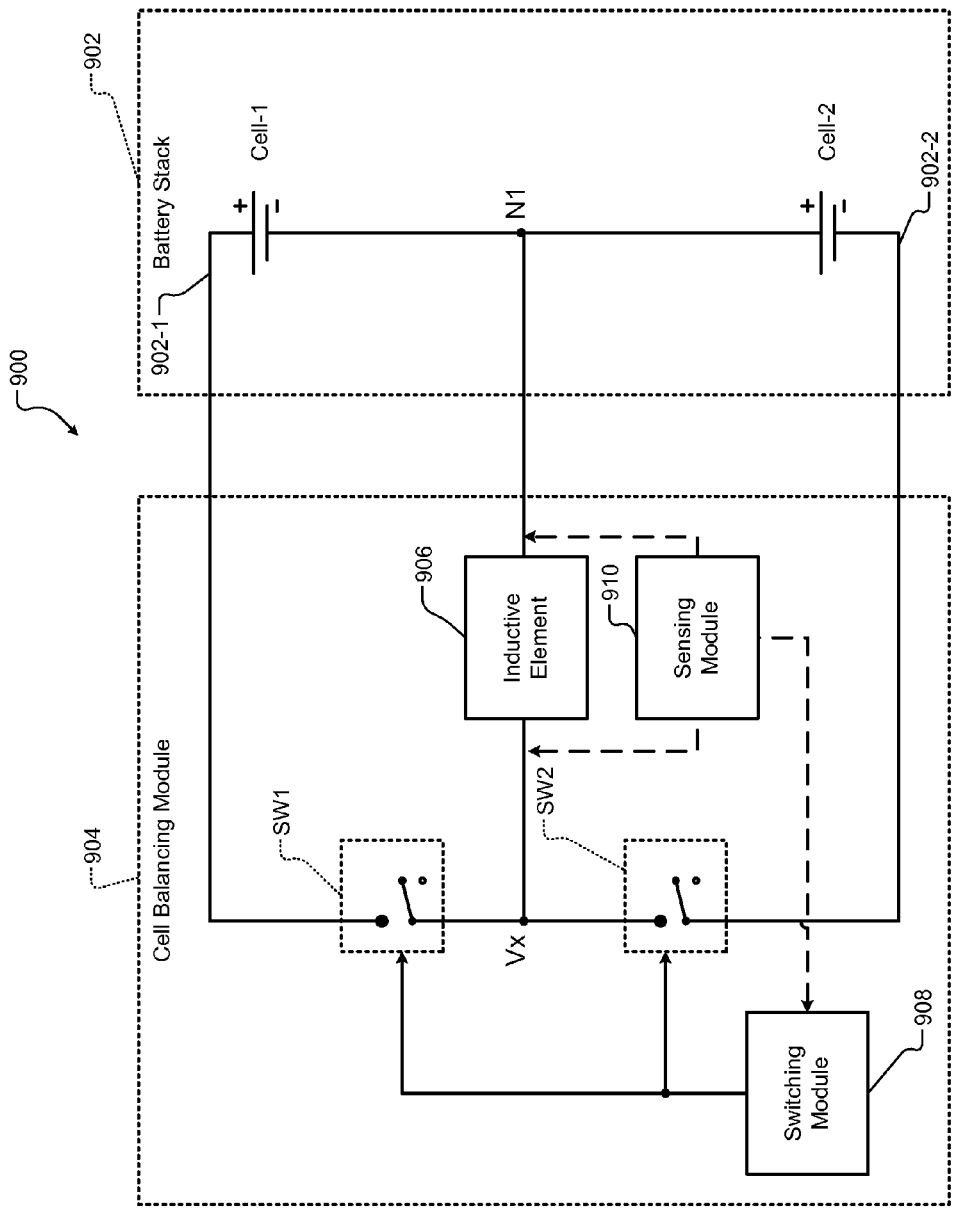
FIG. 9 is a functional block diagram of a system for charging/discharging two adjacent cells of a battery stack utilizing an inductive element.

FIG. 9 illustrates another system 900 for balancing output voltages of cells in a rechargeable battery stack. The system 900 includes a cell balancing module 904 and a rechargeable battery stack 902. The cell balancing module 904 comprises two switches SW1 and SW2, a switching module 908, a sensing module 910 and an inductive element 906.

The inductive element 906 may include an inductor or any other devices that can be used to effect inductance. The inductive element 906 is coupled between a node N1 between Cell-1 902-1 and Cell-2 902-2 and a node Vx between the switches SW1 and SW2. The use of the inductive element 906 provides higher current handling capacity, as compared to the use of capacitance in the system 100 described above.

The switching module 908 controls switching of the switches SW1 and SW2 in response to a control signal from the sensing module 910.

The sensing module 910 senses the current across the inductive element 906, or alternatively, senses the voltage at node Vx.

The system 900 performs cell balancing between Cell-1 902-1 and Cell-2 902-2 as follows. In one scenario, energy is transferred from Cell-1 902-1 to Cell-2 902-2. Switch SW1 is turned on and switch SW2 is turned off by the switching module 908. This creates a current through the inductive element 906. Then, switch SW1 is turned off and switch SW2 is turned on until the current through the inductive element 906 is greater than or equal to zero. Switch SW2 is then turned off once the current through the inductive element 906 is greater than or equal to zero. Current through the inductive element 906 is sensed or monitored by the sensing module 910. Alternatively, a waiting period is taken until voltage at node Vx and voltage at node N1 are approximately equal. Then, the sensing module 910 can sense the voltage at node Vx to effect the switching accordingly. The foregoing switching of switches SW1 and SW2 can be repeated as needed.

In another scenario, energy is transferred from Cell-2 902-2 to Cell-1 902-1. To achieve such energy transfer, the switching sequence as described above in connection with the energy transfer from Cell-1 902-1 to Cell-2 902-2 is reversed.

When Cell-1 902-1 and Cell-2 902-2 are balanced, the switches SW1 and SW2 are turned off.

Based on the disclosure and teachings provided herein, it should be understood that the cell balancing module 904 having an inductive element 906 may be utilized in similar arrangements as described in connection with the cell balancing module 104 having a capacitive element, e.g., FIGS. 2A, 3A, 3B, 3D, 3E, 4A, 5A and 6A.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
   a rechargeable battery pack including a plurality of cells, wherein the plurality of cells of the rechargeable battery pack are connected in series; and
   a plurality of cell balancing modules, wherein each cell balancing module of the plurality of cell balancing modules is configured to perform voltage balancing of a respective pair of cells,
   wherein each cell balancing module includes a communication module configured to
      (i) transmit, via a communication link, information about voltages of the respective pair of cells to adjacent ones of the plurality of cell balancing modules, and
      (ii) receive, via the communication link, from adjacent ones of the plurality of cell balancing modules, information about voltages of cells corresponding to the adjacent ones of the plurality of cell balancing modules, and wherein in response to a voltage difference between any of the plurality of cells in the rechargeable battery pack being greater than or equal to a predetermined threshold, each cell balancing module is configured to perform the voltage balancing (i) based on the information received from the adjacent ones of the plurality of cell balancing modules about the voltages of the cells corresponding to the adjacent ones of the plurality of cell balancing modules, instead of (ii) based on a difference between voltages of the respective pair of cells.

2. The system of claim 1, wherein each cell balancing module further comprises:

a sensing module configured to sense the voltages of the respective pair of cells; and a switching module configured to alternately connect a capacitance across a first cell and a second cell of the respective pair of cells at a switching frequency in response to a difference in the voltages of the first cell and the second cell being greater than or equal to a first threshold, and stop alternately connecting the capacitance across the first cell and the second cell of the respective pair of cells at the switching frequency in response to the difference in the voltages of the first cell and the second cell being less than or equal to a second threshold, wherein the first threshold is greater than the second threshold.

3. The system of claim 2, wherein each cell balancing module further comprises the capacitance to transfer charge between the first cell and the second cell of the respective pair of cells in response to the capacitance being alternately connected across the first cell and the second cell of the respective pair of cells at the switching frequency.

4. The system of claim 3, wherein each cell balancing module is further configured to prevent overcharging and over-discharging of the first cell and the second cell by (i) alternately connecting the capacitance across the first cell and the second cell and (ii) transferring charge between the first cell and the second cell.

5. The system of claim 1, further comprising a stack control module configured to:

communicate with one of the plurality of cell balancing modules via the communication link, receive, from the one of the plurality of cell balancing modules, information about voltages of the plurality of cells in the rechargeable battery pack via the communication link, and control coupling of the rechargeable battery pack to a charging system based on the information about the voltages of the plurality of cells in the rechargeable battery pack.

6. The system of claim 5, wherein the stack control module is configured to control coupling of the rechargeable battery pack to a load based on the information about the voltages of the plurality of cells in the rechargeable battery pack.

7. A method for balancing voltages of a plurality of cells in a rechargeable battery pack, wherein the plurality of cells of the rechargeable battery pack are connected in series, and wherein the rechargeable battery pack further includes a plurality of cell balancing modules, the method comprising:

each cell balancing module of the plurality of cell balancing respectively performing voltage balancing of a respective pair of cells in rechargeable battery pack;

each cell balancing module receiving, via a communication link, from adjacent ones of the plurality of cell balancing modules, information about voltages of cells corresponding to the adjacent ones of the plurality of cell balancing modules; and in response to a voltage difference between any of the plurality of cells in the rechargeable battery pack being greater than or equal to a predetermined threshold, each cell balancing module performing the voltage balancing based on (i) the information received from the adjacent ones of the plurality of cell balancing modules about the voltages of the cells corresponding to the adjacent ones of the plurality of cell balancing modules, instead of (ii) based on a difference between voltages of the respective pair of cells.

8. The method of claim 7, wherein performing the voltage balancing based on a difference between voltages of the respective pair of cells comprises:

sensing the voltages of the respective pair of cells;

alternately connecting a capacitance across a first cell and a second cell of the respective pair of cells at a switching frequency in response to a difference in the voltages of the first cell and the second cell being greater than or equal to a first threshold; and stopping alternately connecting the capacitance across the first cell and the second cell of the respective pair of cells at the switching frequency in response to the difference in the voltages of the first cell and the second cell being less than or equal to a second threshold, wherein the first threshold is greater than the second threshold.

9. The method of claim 8, wherein performing the voltage balancing based on a difference between voltages of the respective pair of cells further comprises transferring charge between the first cell and the second cell of the respective pair of cells in response to the capacitance being alternately connected across the first cell and the second cell of the respective pair of cells at the switching frequency.

10. The method of claim 9, further comprising preventing overcharging and over-discharging of the first cell and the second cell by (i) alternately connecting the capacitance across the first cell and the second cell and (ii) transferring charge between the first cell and the second cell.

11. The method of claim 7, further comprising:

communicating with one of the cell balancing modules via the communication link;

receiving, from the one of the plurality of cell balancing modules, information about voltages of the plurality of cells in the rechargeable battery pack via the communication link; and controlling coupling of the rechargeable battery pack to a charging system based on the information about the voltages of the plurality of cells in the rechargeable battery pack.

12. The method of claim 11, further comprising controlling coupling of the rechargeable battery pack to a load based on the information about the voltages of the plurality of cells in the rechargeable battery pack.

* * * * *